3,590,119
FLOATING LARVICIDE
Nathan F. Cardarelli, Copley, and Joseph C. Hess, Cuyahoga Falls, Ohio, assignors to The B. F. Goodrich Company, New York, N.Y.
No Drawing. Filed Nov. 1, 1968, Ser. No. 772,807
Int. Cl. A61k 27/12
U.S. Cl. 424—22    2 Claims

ABSTRACT OF THE DISCLOSURE

Malaria, yellow fever and similar diseases are spread by water-spawned organisms particularly those that go through a larval stage in their life cycle. Mosquitoes are attacked in the larval stage with organic phosphorothioate larvicides, chlorinated hydrocarbons, and addition products of ethylene oxide and aliphatic alcohols such as oleyl alcohol which kill larvae when spread upon an infested water supply. Direct dispersion of the toxicant or toxicant with known carriers onto the infested waters has very limited periods of effectiveness against the larvae and simultaneously pollutes the water. It is discovered that delayed toxicant release, much longer protection, and less water pollution result when certain toxicants are dissolved into a particular elastomeric matrix and then pellets or pieces of the resulting composition (preferably in vulcanized form) are dispersed upon the infested water. Ethylenepropylene-diene terpolymer rubbers known as EPDM rubbers are suitable elastomers for this purpose. When the elastomeric-toxicant compositions are in floating contact with infested water, a toxic substance is released slowly from the composition into the water at the water surface and the composition is capable of maintaining a toxic concentration to larvae for periods of months in stagnant water. The larvicidal elastomeric (or rubber) compositions contain an organic toxicant dissolved in a vulcanized EPDM rubber matrix specially compounded and cured in such a fashion that the toxicant remains soluble and sufficiently mobile in the matrix as to diffuse to the surface of the matrix at a selected, controlled rate and to be released therefrom into the water environment by molecular release at a rate adapted best to carry out the larvicidal application.

CROSS-REFERENCE TO RELATED APPLICATIONS

A related background application is U.S. Ser. No. 741,223 filed June 28, 1968, claiming a biocidal elastomeric-organic toxicant composition which is useful in the form of sinkable pellets or strips for biocidal activity. The present application is drawn to larvicidal EPDM-organic toxicant compositions which are useful in the form of floating pellets or strips for poisoning mosquito larvae in the specific water level where these organisms live, namely the zone just at and just below the water surface sometimes known as the infraneustral zone.

BACKGROUND OF THE INVENTION

This invention relates to certain toxicants and the dissemination of them in controlling disease-spreading, water-spawned organisms by means of a floating medium. The invention is useful to public health authorities in killing the larvae of mosquitoes, responsible for transmitting malaria, yellow fever, dengue fever, and related diseases.

Prior to this invention, aquatic larvae have been combatted and destroyed either by poisoning the water breeding areas to their full depth, or by covering such water with oily film-forming materials which fatally damage the respiratory or other physiological processes of the organism. These basic techniques are generally effective but have well-recognized limitations.

While numerous toxicants are known for killing these disease-causing and disease-propagating organisms, there are many reasons why their use had not led to the elimination of these dread diseases. For example, the use of DDT against the mosquito has not been too effective because of great expense, limited effective life of the insecticide requiring frequent reapplications, the evolutionary development of DDT-resistant strains of mosquito, and widespread controversy over real or imaginary toxic effects of the insecticide on human and other animal and vegetable life, particularly on our wild animals, birds and fish. By and large, these pests have been combatted by direct application to the infested water of the pure toxicant or of the toxicant on or in a diluent carrier. This has resulted in very limited periods of effectiveness (i.e. measured in from days up to 6 weeks in stagnant water; much less in even slowly flowing water) necessitating frequent reapplication. DDT, oils and other mosquito larvicides are applied as often as twelve times a year in some areas of the southern United States. Applied in this fashion over any period of years, the total dosage of toxicant is enormous and never 100% effective. Also, direct application of toxicant may lead to at least temporary high local concentrations due to poor dispersion, which concentration can be very toxic to other forms of life.

The larvicidal compositions disclosed in copending application Ser. No. 741,223 filed June 28, 1968, are all materials which when compounded for slow release of the organic toxicant have specific gravities greater than 1.0, and hence the particles of these compositions sink to the bottom when they are dropped upon a water surface. Most of the materials of that invention are based on elastomers having high specific gravities, e.g. natural rubber—0.93, styrene-butadiene rubber—0.34, nitrile rubber—0.98, and the like. When 100 parts by weight of these named elastomers is combined with 5–60 parts by weight carbon black (sp. gr. 1.8) for control of toxicant release rate and with other materials for cure of the elastomer, the composition specific gravity is well over 1.0. The EPDM rubbers (sp. gr. 0.85 to 0.88) have lower specific gravities than the elastomers listed above and are disclosed in the form of the invention of the copending application as requiring loadings of the appropriate carbon blacks of at least (65 to 100 phr.) to obtain a specific gravity in excess of 1.0. These highly carbon black loaded EPDM compositions sink in water carrying the toxicant below the primary water zone for larvae inhabitation. Such a high carbon black content also drastically retards toxicant loss when organic phosphorothioate larvicides are used thus requiring much greater dosages for efficiency.

Larvae, as a life form, develop from eggs laid in or on water, generally shallow water and, after hatching, dwell near the water surface for feeding and respiratory purposes. The logical and most economical and most effective place to attack this life form is at the water surface and this is best done by employing a floating larvicide—e.g. like the hydrocarbon oil and alcohol mixtures cited above. A larvicide that sinks to the water bottom obviously must be employed in a greater quantity than one that can float because sinkable materials have to contain sufficient toxicant to insure that it is released, then spread through the entire volume of the treated water to insure that the critical zone just a few millimeters below the surface, is affected. A floating larvicide has the enormous advantage of being in the immediate larval environment at all times and of not appreciably affecting the volume of water below that zone in any manner.

Conventional larvicides such as DDT, some organophosphorous compounds, arsenic, etc., are very dangerous to store and to distribute, and they must be used with great care to avoid excessively poisoning water, i.e. poisoning it to the extent it would be unfit and dangerous for use by humans, cattle, fish and the other desirable marine and bird life. Oils used for larvicidal purposes practically always destroy the utility of a pond or water course for livestock and other animals and marine life while in use and therefore can be used to only a very limited extent.

When larvicides are spread directly on a body of water either as a dust or as an oil they are subject to reduced effectiveness by degradation through hydrolysis, degradation by chemical attack of organic matter, and possible loss as droplets on foliage screening the water.

It has been known in the art to mechanically incorporate larvicides on solid materials such as clay (sp. gr. 2.6), polyvinyl chloride (sp. gr. 1.4) and the like. In these cases the pigments act merely as binders or adsorbents, retaining the toxicant for several days and slowing the loss of toxicant to the water for perhaps 3 or 4 days. The toxicant release mechanism is leaching by the water or gradual dissociation of the binder-toxicant mixture into the water. In another instance polystyrene beads and polystyrene foam spheres have been immersed in liquid larvicide. These forms of carrier have great surface area and adsorb relatively large volumes of larvicide, but the mechanism again is mechanical in nature and the toxicant is not long lived.

Periods in which such treatments are effective are quite limited, even in stagnant water. Ordinary larvicides sprayed into stagnant water in recommended concentrations may be effective for about six to eight weeks. Their effectiveness is much shorter for slowly flowing waters such as the water of typical irrigation ditches. Oiling a pond may be effective for several months. Prior art larvicides have numerous shortcomings which can be summed up by the facts that they tend to sink below the water zone where larvae are active and their toxicant life is too short.

The preferred toxicants used in the elastomeric compositions discussed in this application have been shown in the prior art as being toxic to certain water-spawned organisms.

DESCRIPTION OF INVENTION

According to this invention a floating larvicidal EPDM rubber composition is provided which is particularly effective against the larvae noted but which is not harmful to other fish and animal life in the concentrations suitable for killing larvae, and which provides an unusually long term larvicidal action as compared with the prior art techniques.

The vulcanized EPDM elastomer, containing a larvicidal organic toxicant dissolved therein and compounded and cured to exhibit a specific gravity less than 1.0 and controlled release of the toxicant is a unique class of materials capable of molecular release of the organic toxicant into water at controlled rates thereby making it possible to maintain at the surface of the treated water the lowest lethal larvicidal levels of toxicant over very long periods of time.

The larvicidal EPDM elastomeric compositions of this invention are special rubbery compositions in which both the concentration of larvicidal toxicant dissolved therein, on the one hand, and the proportion of certain types of compounding ingredients and the state of cure or vulcanization on the other, are balanced or adjusted, as to provide, when vulcanized, a rubbery elastic matrix in which the organic toxicant remains appreciably soluble and sufficiently mobile as to diffuse to the surface of the composition at a rate at which it is removed from the surface and which is finite, low and selected for the intended larvicidal application. Such surface toxicant is released to the water environment by molecular release.

Molecular release of toxicant is by far the most efficient system in a statistical and biocidal sense. Prior art methods involve direct application of the pure or merely physically-diluted forms of toxicants, such as for example, toxicants absorbed in clay granules. Much of the effective agent is released as an aggregate and, statistically, the chance of direct contact of the molecular aggregate with the target pest is low. Much lower concentrations of the same toxicant released over longer periods by the described mechanism puts the released toxicant to work at the desired place in its most active and economical form.

Molecular release of toxicant at low levels by means of these larvicidal EPDM rubbers may permit the use of many organic toxicants of known high larvicidal activity, but which are known to hydrolyze or oxidize or which are easily absorbed or destroyed too rapidly to be useful for the desirable length of time. The EPDM rubber matrix holds the toxicant in solution and protects it from contact with water until after release and, as the larvicidal activity of released material dissipates, the toxicant is quickly renewed from the matrix reservoir and thus a sustained toxicity of the water course is maintained over long periods.

When specific organic phosphorothioate toxicants are used as the toxic compounding agent for these elastomer compositions, the toxic element is only slightly soluble in water but is highly soluble in the vulcanizable EPDM elastomer matrices. The active toxic agent in the elastomeric composition dissolves steadily and progressively but very slowly from the surface of the composition when the particles are floated on water. The actual toxicants eventually dissolved into the infested water from the larvicidal EPDM elastomer compositions have not been positively identified but are believed to be identical to the starting toxic agents.

These larvicidal EPDM rubber compositions are preferably in vulcanized form for use. They may be prepared in a wide variety of shapes and forms depending on the service required. A preferred form is pellets or dusts. Strips may also be floated on the water and even anchored in place if there is a moderate water flow. The pellets, for example, may be considerably smaller and lighter in weight than a kernel of corn. These compositions may be molded also into any configuration or article in accordance with conventional techniques in the rubber manufacturing art. In whatever the form, these compositions are relatively safe and non-toxic to humans and higher animal forms while they are in storage or in shipment to the site of use and they remain stable and effective for indefinite periods of storage. To distribute these larvicides for use, the EPDM compositions are merely dropped onto the pond or other body of water. Being solid and compact, though light weight, the pellets have sufficient force to strike through light foliage to the water surface. Foam particles, such as polystyrene foam pellets, are so light that they can be blocked from water by even light intervening foliage or blown away by the wind. The pellets of the invention do not require any special distribution in the water. The water progressively picks up the toxic agent from the wet surface of the floating elastomer and it, in turn, poisons the larvae.

Conventional destruction of mosquito larvae is usually based upon short time, and hence, massive dosages. Physiological destruction is as well accomplished by exposing the organism to lower dosages for longer periods of time, and one can efficiently utilize relatively smaller amounts of active agent in the water by the method presented herein. Less toxicant pollution results and there is less danger to aquatic life. A body of water treated with these floating larvicides can remain as useful as ever for regular fish and livestock uses. In some cases such water can be safely used for human consumption while being treated.

The preferred class of toxicants for these larvicidal elastomeric compounds is the organic phosphorothioates. The EPDM elastomers are specially compounded to maintain a specific gravity less than one so that pellets or other particles of compounded larvicides will float on the water surface and at the same time to have controlled release of toxicant to the water.

The compositions of this invention differ from the EPDM elastomer-toxicant compositions set forth in Ser. No. 741,223 filed June 28, 1968 in that they have a specific gravity less than 1.0 and float on water. They also differ from the compositions of that invention in that they contain only 2 to 8 parts carbon black per 100 parts EPDM elastomer by weight.

Unvulcanized EPDM elastomeric compounds including the organic phosphorothioate toxic agent are somewhat effective as larvicides but it is believed that the vulcanized form of these same compositions is considerably more effective than the unvulcanized form. This is due to the toxicant's being more tightly bound within the elastomeric matrix by vulcanization so that the loss of toxicant to the water course is gradual and continual. This conclusion is based on studies made by the time required to kill a given number of mosquito larvae in equal volumes of water with equal weights of various elastomeric compositions in both the vulcanized and unvulcanized states.

The long-term larvicidal action provided by these EPDM larvicidal rubber compositions appears to result from the physical mechanism of solubility equilibrium. For this reason it is important to select or prepare the EPDM elastomeric base so that the toxicant agent is in fact soluble in it. According to the theory of solubility equilibrium, the water in contact with the elastomeric composition progressively takes up the toxic molecules at the rubber-water interface, unbalancing the equilibrium of the molecular dispersion of the toxic throughout the interior of the elastomeric composition and thereby causing the migration of additional toxic molecules to the surface or water-interface to re-establish equilibrium solubility. This process continues until the toxic agent is substantially depleted. On the other hand, because of their low solubility in water, the toxic agents cannot be depleted from the EPDM elastomeric composition at a rate greater than its diffusion-dissolution rate. It has been found that in a given body of infested water reasonable amounts of these EPDM elastomeric compositions can provide larvicidal protection for a period of at least several months as against a period measured in days when the same toxicants are directly dispersed in the water in accordance with the prior art techniques. Cold freezing weather itself will kill larvae but low temperatures in themselves have no effect on the efficiency of these compositions to provide the desired larvicidal action whenever warm weather and the problem return.

These larvicidal EPDM rubber compositions may be made and sold at reasonable prices, and are easy and simple to use by even the most unskilled and uninformed person. The user is not required to undertake any mixing activity himself. These compositions, therefore, are of extraordinary value in primitive or "under developed" areas where the protection needed is high and the technical abilities of the users limited.

The particular elastomers useful in the practice of this invention are the solid plastic interpolymers of ethylene, a higher alpha-olefin, and a minor proportion of a non-conjugated diolefin. These interpolymers are characterized by higher molecular weight, low unsaturation and moderate reactivity (vulcanization or curing) with sulfur to yield an elastic product. Such interpolymers, known as ethylene:propylene:diene polymers, are described in U.S. Pats. Nos. 2,933,480 and 3,000,866 among others. The presently best known examples of such interpolymers are terpolymers of ethylene, propylene and 1-4-hexadiene, ethylene, propylene, dicyclopentadiene and ethylene, propylene and ethylene norbornene.

Preferred ethylene, higher alpha-olefin, nonconjugated diolefin interpolymers for use in preparing larvicidal compositions are the solid plastic rubbery interpolymers similar to those described in U.S. Pats. 2,933,480 and 3,000,866. Among these, for example, are interpolymers of ethylene and a higher alpha-olefin, both of which have terminal unsaturation, and a diolefin in which the double bonds are separated by more than 2 carbon atoms and in which at least one of the double bonds is terminally located. These materials are rubbery polymers of ethylene, at least one alpha-olefin higher in the series than ethylene having the structure R—CH=CH$_2$ where R is a C$_1$-C$_8$ alkyl radical, and a non-conjugated diolefin selected from the class consisting of diolefins containing 5 to 22 carbon atoms in chain configurations selected from the class consisting of straight chain, branched chain and cyclic chains. representative alpha-olefins include propylene, butene-1, pentene-1, and octadecene-1. The preferred alpha-olefin is propylene and the preferred diolefin is 1,4-hexadiene.

The rubbery interpolymers comprise in general at least 20% by weight monomer units of ethylene, preferably not over 74.5% by weight, between 25% and 79.5% monomer units by weight of higher alpha-olefin and from 0.5% to not more than 10% by weight diolefin monomer units. Methods of preparing the interpolymers are known in the art and do not comprise an essential part of this invention. Such interpolymers may be prepared by use of catalysts known as coordination catalysts made from components of two types, first, compounds of transition heavy metals of groups IV, V and VI beginning with titanium, vanadium and chromium, and, second, organometallic compounds, hydrides and free metals of groups I, II and III. Compounds of the first type are preferably halides, oxyhalides and alcoholates, with titanium and vanadium the preferred metals. The metals of the second component are preferably lithium, sodium, magnesium, and aluminum and the organic portions are preferably alkyl radicals. In the organometallic compounds the valences of the metal may be partly satisfied by halogen or alkoxyl, if at least one bond connects the metal with an organic radical.

These catalysts must be used in strict absence of water or oxygen and the preferred solvents in which to use them are saturated aliphatic and hydroaromatic hydrocarbons and nonreactive halogen compounds such as tetrachloroethylene. Polymerizations normally are carried out at ordinary temperatures and pressures.

The preferred class of toxicants used as compounding ingredients in the foregoing elastomers are organic phosphorothioate compounds which are (a) toxic to larvae of mosquitos, midges and other organisms; (b) soluble in the EPDM elastomers; and (c) slightly soluble in water. Typical compounds are phenyl phosphorothioates of the general formula

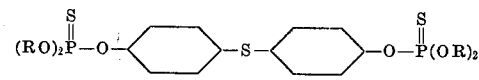

wherein R is an alkyl group containing 1 to 5 carbon atoms. The prime requisite of the toxicant has been found to be the presence of at least one phosphorothioate grouping,

illustrative materials of this type include: O,O-dimethyl O[4-(methylthio)-m-tolyl] phosphorothioate, trade name (Baytex); O,O-diethyl O(3,5,6-trichloro-2-pyridyl) phosphorothioate, trade name (Dursban); O,O-dimethyl O-diethylmercaptosuccinato phosphorothioate, trade name (Malathion); O,O-diethyl O-phenylmethyl sulfinyl phosphorothioate, tributyl phosphorothioate; O,O,O',O'-tetramethyl O,O'-thiodi-p-phenylene phosphorothioate, trade name (Abate); and others of similar configuration.

In the preparation of these larvicidal rubber compositions, the concentration of the toxic additives may vary between 3.0 parts per hundred parts of the EPDM elastomer (pphr.) to about 20.0 parts per hundred parts of the elastomer, depending upon the respective solubility of the toxicant in the elastomer. The preferred concentration is the maximum quantity which is capable of dissolving in the EPDM elastomer, although quantities in excess of this may be used effectively inasmuch as the effect of the additive on the physical properties of the EPDM elastomer for this purpose is usually of no importance.

Basic or conventional rubber compounding techniques and equipment are used in the preparation of these compositions, and no special manufacturing precautions or equipment are required. Some of the most effective toxic additives are in the form of powders which are dispersed into the EPDM elastomer like other dry compounding ingredients. Other of these toxic additives are in the form of oils as they are presently commercially available and these oils also provide some measure of processing assistance in the compounding operations.

Carbon black, zinc oxide, lubricants, sulfur and sulfur accelerators, which are known pigments in the art of compounding rubbers, have the effect of reducing the rate of diffusion of the organic phosphorothioates dissolved in the vulcanized matrix. The favored accelerators are the benzothiazyl disulfides and the thiuram disulfides. A ratio of benzothiozyl disulfide: sulfur:thiuram disulfide of 0.5:1.5:1.5 creates proper matrix conditions. The preferred carbon black is one of the fine structure carbon blacks such as ISAF, HAF, SAF, and MPC in order to achieve adequately slow regulation of loss rate of toxicant from the EPDM matrix. The less structured carbon blacks such as HMF, SRF and MT can be used, but must be employed at higher levels to achieve the desired time release rate for the larvicide. The preferred carbon blacks for controlling the rate of larvicide diffusion from the EPDM matix are those having oil absorptivities of about 9.0 gas./100 lbs. or more and particle sizes in the range 10 to 40 millimicrons (M$\mu$).

Typical preferred carbon blacks are listed below:

| Carbon black type | Particle size, m$\mu$ | Oil adsorptivity, gals./100 lbs. |
|---|---|---|
| SAF | 11–19 | |
| ISAF | 20–25 | ca. 15.0 |
| EPC | 26–30 | ca. 11.0 |
| FF | 31–39 | ca. 9.5 |
| FEF | 40–48 | ca. 9.0 |
| HMF | 49–60 | ca. 7.0 |

A typical composition range for EPDM larvicide combinations with specific gravity less than 1.0 is as follows:

| Material: | Parts by weight |
|---|---|
| Ethylene-propylene-diene terpolymer | 100.0 |
| Zinc oxide | 2.0 |
| Stearic acid | 0.0–2.0 |
| Benzothiazyl disulfide | .072–0.45 |
| Sulfur | 1.25–1.65 |
| Tetramethylthiuram disulfide | 1.30–1.60 |
| Carbon black | 2.0–8.0 |
| Paraffin oil | 18.0–24.0 |
| Larvicide | 3.0–20.0 |

The higher ranges of carbon black (5.0–8.0 phr.) lead to slower release of larvicide toxicant from the rubber matrix. Lower carbon black levels (2.0 to 4.5 phr.) are useful if more rapid release with early quick kill is desired at the expense of shorter total release lifetime.

Compositions as set forth above can be prepared by mill bonding and Banbury mixing. The preferred order of adding of ingredients is terpolymer, carbon black, zinc oxide, stearic acid, paraffin oil, larvicide, sulfur, and accelerators. The batch is mixed at 120° to 150° F. and the raw stock can be extruded as a rod, cured at 300° F. for 40 to 60 minutes and pelletized. Alternatively the stock can be formed as a sheet, cured, then cut into discs or other shapes of desired size; or ground into a fine or coarse dust or powder.

Control of cure temperature and time are important to the success of this invention. Cures above 310° F. and/or longer than 60 minutes have the effect of forming a tighter matrix in the rubber and the loss rate of toxicant is then too low to be effective. Cures at less than 280° F. and/or less than 30 minutes form a loose matrix which may give up or release toxicants at too rapid a rate—shortening larvicide lifetime to periods already attainable by materials and techniques in the art.

By varying the carbon black concentration and type employed and the cure conditions, it is possible for one skilled in the art to achieve any release rate, with a given toxicant concentration, over a wide range. It may be possible to eliminate the carbon black and greatly lengthen the cure time and thereby achieve a long term release of toxicant at some sacrifice in physical properties.

One of the most convenient forms for using these compositions is in pellets or chunks which may be scattered at random into a farm pond, ditch, sewer, septic outcrop, swamp or other water bodies and float on the surface thereof. The actual distribution of the pellets or chunks is unimportant since the effectiveness depends on solubility phenomena in the water. Another convenient form is to make these compositions into strips or tapes and lay them on the surface of irrigation ditches. This is quite useful where there is only slight current or movement in the water. Insect larvae ordinarily are not a serious problem in flowing water but if one wants to protect an area such as an irrigation ditch which has intermittent flow, a floating toxicant tape is an effective way to do it.

Specific examples of typical compositions made in accordance with this invention are:

Example 1

The following farmulations are made by milling pigments and candidate larvicide materials into a commercial EPDM terpolymer, 65 mol percent ethylene, 1.5 mol percent 1,4-hexadiene, DSV 2.3. The rubber is banded on the mill and the pigments are added in the order carbon black, zinc oxide, stearic acid, paraffin oil, larvicide, sulfur and accelerators. The stock is milled for 4 minutes at 120° F. after the insecticide has been fluxed into the band and the compounded rubber is removed as a sheet 0.2 cm. thick.

| Material: | Parts by weight |
|---|---|
| EPDM | 100 |
| Zinc oxide | 2.0 |
| Stearic acid | 1.0 |
| Benzothiazyl disulfide | 0.5 |
| Sulfur | 1.5 |
| Tetra methylthiouram disulfide | 1.5 |
| Carbon black (ISAF) | 5.0 |
| Paraffin oil | 22.0 |
| Larvicide | variable |

Disc-shaped pellets 0.2 cm. thick and 0.6 cm. in diameter are cut from the sheets. Twenty second-instar *Culex pipiens pipiens* L. larvae from a DDT (dichloro-diphenyl-trichloroethane) and Malathion (O,O-dimethyl phosphorothioate diethylmercapto succinate) resistant colony are added to an open quart Mason jar containing 800 ml. distilled water and added organic mater to sustain the larval life. The jars stand for 24 hours to stabilize the contents; then the larvicide pellets are added, one to a jar. A control of EPDM rubber blanks containing all ingredients except larvicide is used. All of the pellets have a specific gravity less than 1.0 and float. All tests are run in replicates of 3 with average results being reported. Larvae mortality rates are recorded and evaporation levels adjusted at 0, 24, 48 and 72 hours. The pellets are removed and air dried for 24 hours following each 72 hour test. Before each test the jars are rinsed with acetone, washed in detergent and water at 185° F. for ten minutes, rinsed in tap water for five minutes and finally rinsed in distilled water for 1 minute.

| Run | Larvicide | Parts larvicide per 100 parts EPDM | Percent mortality/ exposure number |
|---|---|---|---|
| 1 | None (control) | 0 | 0 |
| 2 | Octachloro-2,3,3a,4,7,7a-hexahydro-4,7-methanoindene, trade name (Chlordane). | 5.7 | 0/1<br>0/2<br>0/3<br>20/4<br>0/5-10 |
| 3 | O,O,O',O'-tetramethyl O,O'-thiodi-p-phenylene phosphorothioate trade name (Abate). | 5.7 | 100/1-22 |
| 4 | O,O,O',O'-tetramethyl O,O'-thiodi-p-phenylene phosphorothioate | 7.0 | 100/1-22 |
| 5 | O,O,O',O'-tetramethyl O,O'-thiodi-p-phenylene phosphorothioate | 8.3 | 100/1-22 |

The composition of the invention is the only one to kill 100% of the larvae through twenty-two seventy-two hour water changes alternated with 24 hour drying periods. Time required for 100% mortality actually decreased in later water changes.

When Chlordane (Run 2), a known larvicide is used in place of Abate (Runs 3, 4, 5) in the floating EPDM combination of the invention, it is ineffective. In Run 2 no larvae are killed in the first three water changes, only 20% are killed in the fourth change and none are killed in any change from 5 through 10. Many conventional larvicides are applied to a water pool or water course in such a fashion that they sink, generally to the bottom. This type of application requires a large dose of toxicant for the water volume being treated. The larvicide of the invention is applied in a form that floats at or near the water surface, although toxicant is applied only to the surface area and an insignificant depth beneath that area. Since the larvae must invade the treated water area at the surface in order to survive, they are invariably exposed to lethal concentrations of the larvicide when they do rise to the surface.

Example 2

The procedure of Example 1 is followed except that in place of low specific gravity (0.85–0.88) EPDM, a high specific gravity (1.23) elastomer, neoprene (Run 7) and a 20/80 acrylonitrile-butadiene rubber, compounded sp. gr. (1.25) (Run 8) are used. The discs of these compositions sink to the bottom of the water.

most completely released in two weeks. At twenty four hour intervals twenty of the *Culex pipiens pipiens* L, larvae described in Example I are added. Larvae kills of 100% are recorded for 14 days; then the mortality rate falls off to zero by the 28th day.

Example 5

Fifteen grams of pellets of the composition of Run 4, Example 1, but 1/8" in diameter by 1/32" thick, are placed in 10 fifty-five gallon drums containing 10, 20, 30, 40 and 50 gallons of water which stand to simulate rain water collection barrels as used in many areas of the world. Twenty larvae of the type described in Example 1 are added to each barrel at weekly intervals and observed at 12 and 24 hours of residence in the water. After 18 weeks mortality in each barrel is still 100% within twenty four hours. After 16 weeks the concentration of the larvicide in the water is analyzed and in every one of the ten barrels is found to be less than one part per million of water, hence the water is safe for consumption.

We claim:

1. In a method for killing water-spawned disease-transmitting larvae of mosquitos comprising floating on infested infraneustral zone water having only slight to intermittent flow or current, and wherein water changes subject the larvae to alternating drying periods, a larvicidal, buoyant elastomer composition, the improvement which comprises effecting larvae mortality by employing chunks, discs, pellets, strips or tapes of vulcanized EPDM

| Run | Larvicide | Parts larvicide per 100 parts elastomer | Percent mortality/ exposure number |
|---|---|---|---|
| 7 | O,O,O',O'-tetramethyl O,O'-thiodi-p-phenylene phosphorothioate | 8.4 | 15/1<br>40/2<br>0/3<br>15/4<br>0/5-10 |
| 8 | O,O,O',O'-tetramethyl O,O'-thiodi-p-phenylene phosphorothioate | 5.1 | 0/1-10 |

When the effective toxicant of the floating compositions of Example 1 is compounded into compositions with specific gravity greater than 1.0, and with a similar release rate, its effectiveness against larvae at the surface and immediate subsurface water zone is reduced or destroyed.

Example 3

The procedure of Example 1 is followed with the larvicide composition of Run 4. The composition is run through 26 complete water changes and is still achieving 100% kill of larvae when the tests are discontinued.

Example 4

Fifteen grams of commercial polystyrene foam are soaked for one week in liquid larvicide Abate. In this period the foam picks up by adsorption over twice its own weight of larvicide (32.5 grams). When the treated foam is placed in water it floats, but the larvicide is alelastomer composition containing O,O,O',O' (tetramethyl), O,O'-dithio-p-phenylene phosphorothioate as toxicant dispersed therein said toxicant being only slightly soluble in the water, said toxicant progressively transferring from the said elastomer into the surface and immediate subsurface zones of the infested water over an extended period of time.

2. A larvicidal EPDM elastomeric composition having a specific gravity at 25° C. less than 1.0 and comprising a vulcanized elastomeric matrix containing EPDM elastomer, from about 3.0 to about 20.0 parts by weight per 100 parts by weight of said elastomer in said matrix of O,O,O',O' (tetramethyl), O,O'-dithio-p-phenylene phosphorothioate larvicidal toxicant dissolved in said matrix and from 2 to about 7 parts by weight of a carbon black per 100 parts by weight of said elastomer, said matrix being cured for 40 to 60 minutes at 300–280° F. and the proportion of said carbon black in the range given being selected to yield a desired rate of release of said toxicant by said composition to its environment.

References Cited

UNITED STATES PATENTS

| | | | |
|---|---|---|---|
| 3,426,473 | 2/1969 | Cardarelli et al. | 43—131 |
| 3,497,990 | 3/1970 | Jeffries | 43—131 |
| 3,505,758 | 4/1970 | Willisford | 43—131 |
| 3,127,235 | 3/1964 | Benzel | 21—60.5 |
| 3,317,636 | 5/1967 | Lovell et al. | 260—929 |
| 3,417,181 | 12/1968 | Cardarelli | 424—14X |

SHEP K. ROSE, Primary Examiner

U.S. Cl. X.R.

21—60.5; 43—131; 106—15; 424—78, 205